US 6,792,341 B2

(12) United States Patent
Hunt et al.

(10) Patent No.: US 6,792,341 B2
(45) Date of Patent: Sep. 14, 2004

(54) METHOD AND SYSTEM FOR CONTROLLING POWER DISTRIBUTION IN A HYBRID FUEL CELL VEHICLE

(75) Inventors: Thomas Howard Hunt, Farmington Hills, MI (US); Raymond Spiteri, Sterling Hgts., MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/249,521

(22) Filed: Apr. 16, 2003

(65) Prior Publication Data

US 2004/0083039 A1 Apr. 29, 2004

Related U.S. Application Data

(60) Provisional application No. 60/420,772, filed on Oct. 23, 2002.

(51) Int. Cl.$^7$ ................................................. G06F 7/00
(52) U.S. Cl. ......................... 701/22; 701/99; 180/65.3; 180/65.8
(58) Field of Search ............................... 701/1, 22, 36, 701/99; 318/139; 429/12, 17, 19, 22; 320/124, 132, 136, 137; 322/15, 16; 180/65.1, 65.3, 65.8; 700/297

(56) References Cited

U.S. PATENT DOCUMENTS

| | | | | |
|---|---|---|---|---|
| 4,931,947 A | * | 6/1990 | Werth et al. | ................. 700/297 |
| 4,961,151 A | * | 10/1990 | Early et al. | ................. 700/297 |
| 4,962,462 A | * | 10/1990 | Fekete | ......................... 700/297 |
| 5,646,852 A | | 7/1997 | Lorenz et al. | |
| 5,678,647 A | * | 10/1997 | Wolfe et al. | ................. 180/65.3 |
| 5,771,476 A | | 6/1998 | Mufford et al. | |
| 5,877,600 A | * | 3/1999 | Sonntag | ....................... 318/139 |
| 5,991,670 A | | 11/1999 | Mufford et al. | |
| 6,321,145 B1 | | 11/2001 | Rajashekara | |
| 6,534,950 B2 | * | 3/2003 | LeBoe | ......................... 320/104 |
| 6,541,143 B2 | * | 4/2003 | Herdeg et al. | ................. 429/19 |
| 6,555,928 B1 | * | 4/2003 | Mizuno et al. | ........... 290/40 C |
| 2002/0064697 A1 | | 5/2002 | Sugiura et al. | |

OTHER PUBLICATIONS

SAE Technical Paper Series 2002–01–0096, entitled "Development of Fuel–Cell Hybrid Vehicle", by Tadaichi Matsumoto et al.; Toyota Motor Corp; Mar. 4–7, 2002.
U.S. patent application Ser. No. 10/249,522, Zhang et al., filed Apr. 16, 2003.

* cited by examiner

*Primary Examiner*—Richard M. Camby
(74) *Attorney, Agent, or Firm*—Brooks Kushman P.C.; Carlos L. Hanze

(57) ABSTRACT

A power distribution control system for a hybrid fuel cell vehicle is provided. The system includes a high voltage energy converter (HVEC) for providing current from an electrical bus to the battery, or from the battery to the bus. As a vehicle load increases, the HVEC temporarily provides current to the bus from the battery. A feedforward signal is input into a fuel cell subsystem so that the fuel cell begins to generate additional current. As additional fuel cell current becomes available, an HVEC controller reduces the amount of current the HVEC provides to the bus from the battery, until there is a zero net current flow to and from the battery. At this point, a state of equilibrium is reached and the fuel cell provides all the current required by the vehicle loads.

20 Claims, 4 Drawing Sheets

METHOD AND SYSTEM FOR CONTROLLING POWER DISTRIBUTION IN A HYBRID FUEL CELL VEHICLE

CROSS REFERENCE TO RELATED APPLICATIONS

This application claims the benefit of U.S. provisional application Ser. No. 60/420,772 filed Oct. 23, 2002.

BACKGROUND OF INVENTION

1. Field of the Invention

The present invention relates to a method and system for controlling power distribution in a hybrid fuel cell vehicle.

2. Background Art

A hybrid fuel cell vehicle may include three power sources for its electrical loads: a battery, the fuel cell, and a traction motor. While powering the vehicle, the traction motor is a load, but during coast-down, the traction motor becomes a generator. This regenerative power can supply current to the other loads or be used to charge the battery. Coordinating the current flow between these sources and the continually varying electrical loads presents a fundamental control problem. Imprecise control can result in reduced fuel economy, poor performance, reliability problems, and possible electrical bus instabilities.

In addition, there are other considerations when utilizing a fuel cell in a power distribution system. For example, unlike a battery, a fuel cell may not be able to instantly supply sufficient current to meet the needs of an increased electrical load. Therefore, the battery needs to "fill in" current temporarily, then taper off when the fuel cell's current output increases. Without the presence of the battery to temporarily supply current, performance may degrade. In addition, the battery may also provide a repository for excess fuel cell current and regenerative current during braking and coast down.

One attempt to integrate a battery into a hybrid fuel cell vehicle is described in SAE Paper No. 2002-01-0096, titled "Development of Fuel-Cell Hybrid Vehicle" ("the SAE Paper"). The SAE Paper describes the use of a battery connected in parallel with fuel cells via a DC/DC converter. The battery is configured to provide a power assist when fuel cell response is delayed, or when the vehicle is driven under high load conditions. The traction motor is located between the fuel cell and the converter; whereas, the fuel cell auxiliary systems are located between the battery and the converter. To determine the fuel cell operational point, power-current (P-I) and current-voltage (I-V) maps are used. A power requirement is input, and using the P-I and I-V maps, a voltage command is determined.

One limitation of the hybrid vehicle described in the SAE Paper is its use of operating modes which do not utilize the fuel cell, but rather, rely solely on the battery to supply all of the power. In such operating modes, all of the vehicle electrical loads are carried by the battery. This may require the use of an undesirably large battery, or place limits on the loads the system is able to handle. In addition, the SAE Paper does not describe a system or method for controlling the rate of change of current flow to or from the battery, nor does it describe how to determine a target rate.

Accordingly, there exists a need for a method and system that provide for controlling power distribution in a hybrid fuel cell vehicle such that a fuel cell works in conjunction with a second power source, such as a battery, ultra-capacitor, or other equivalent electrical storage device, to provide power to vehicle electrical loads, and a system equilibrium is sought, wherein the fuel cell carries all of the vehicle electrical loads, and the current flow of the second power source is adjusted at a target rate until a predetermined constant is reached.

SUMMARY OF INVENTION

Therefore, a power distribution control system for a vehicle having a fuel cell and a second power source connected to an electrical bus is provided. The control system includes a voltage regulator configured to control voltage on the bus. A first controller controls the voltage regulator. The first controller is configured to determine a voltage command and send it to the voltage regulator. The voltage command is related to a target current flow for the second power source, and also related to a target rate for reaching the target current flow. A second controller is provided for controlling the fuel cell. The second controller is configured to provide a fuel cell current request to the fuel cell, and further configured to provide an input to the first controller. The input is related to available fuel cell current.

Some embodiments of the invention also include a power distribution control system having electrical loads connected directly to the fuel cell, which provides a low cost, efficient architecture. Since main power current can go directly from the fuel cell to the loads without passing through another device, the battery and voltage regulator size can be minimal. This may result in an overall cost savings.

In addition, some embodiments of the invention provide a fast, inner control loop to quickly respond to initial transients, and a slower, outer control loop to help ensure smooth transitions as the vehicle electrical loads change. Moreover, embodiments of the invention may include a gain scheduler capable of providing individual response tunings, and an adaptive polarization curve, both of which may increase the response and stability of the power distribution control system.

The invention also provides a method of controlling the power distribution in a vehicle having a fuel cell and a second power source connected to an electrical bus. The method includes adjusting current flow of the second power source a first time at least partly based on a vehicle electrical load change. Available fuel cell current is adjusted partly based on the vehicle electrical load change. The current flow of the second power source is continuously adjusted until an equilibrium point is reached. The continuous adjustment is at least partly based on an actual rate of change of the available fuel cell current.

The invention further provides a vehicle having a fuel cell and a second power source connected to an electrical bus, and a power distribution system for controlling the distribution of power in the vehicle. The power distribution system includes a voltage regulator configured to control voltage on the bus. A first controller is provided for controlling the voltage regulator. The first controller is configured to determine a voltage command and send it to the voltage regulator. The voltage command is related to a target current flow for the second power source, and also related to a target rate for reaching the target current flow. A second controller is provided for controlling the fuel cell. The second controller is configured to provide a fuel cell current request to the fuel cell, and further configured to provide an input to the first controller. The input is related to available fuel cell current.

The invention also provides a computer programmed and configured to execute control algorithms for controlling the power distribution system in a vehicle. The vehicle has a fuel cell and a second power source. The computer includes an algorithm for adjusting current flow of the second power source a first time in response to a vehicle electrical load change. The computer includes an algorithm for adjusting available fuel cell current at least partly based on the vehicle electrical load change. The computer also includes an algorithm for continuously adjusting the current flow of the second power source until an equilibrium point is reached. The continuous adjustment of the current flow is at least partly based on an actual rate of change of the available fuel cell current.

The above objectives, features, and advantages of the present invention are readily apparent from the following detailed description of the best modes for carrying out the invention when taken in connection with the accompanying drawings.

DETAILED DESCRIPTION

Figure 1:
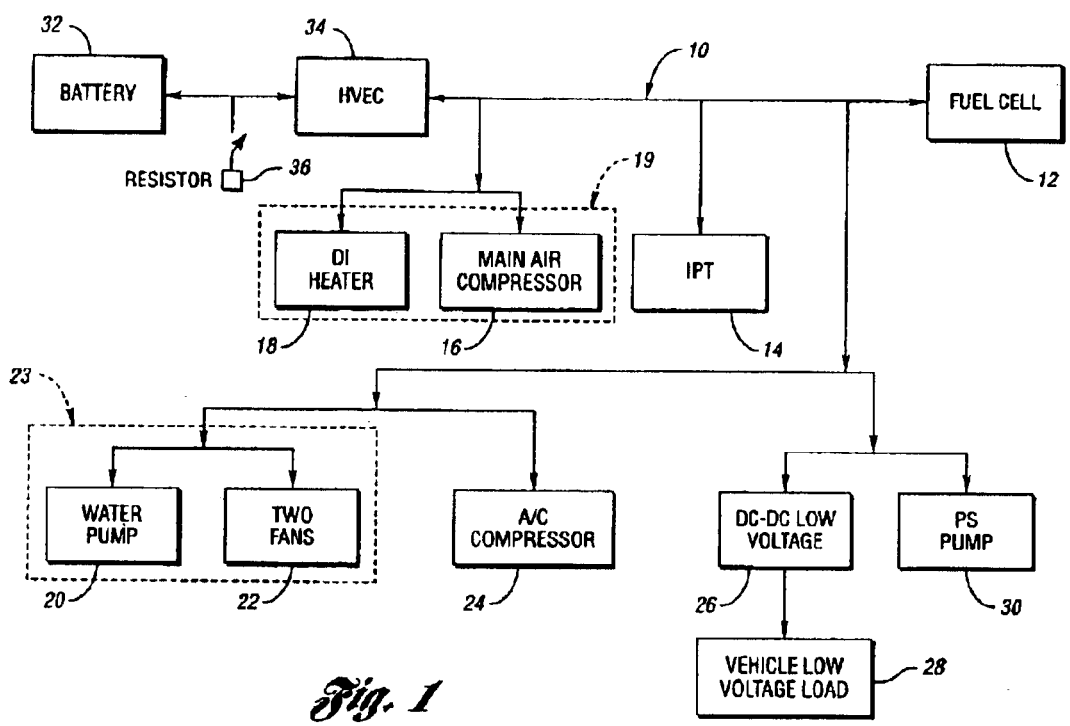
FIG. 1 is a schematic diagram of the loads and power sources connected to a high voltage bus in a hybrid fuel cell vehicle.

FIG. 1 illustrates loads and power sources connected to a high voltage bus 10 in a hybrid fuel cell vehicle. A fuel cell 12 is connected to the bus 10 and supplies current directly to all primary loads. The primary electrical loads illustrated in FIG. 1 include an integrated powertrain (IPT) 14, a main air compressor 16, and a deionized (DI) heater 18. The main air compressor 16 and D.I. heater 18 are part of a fuel cell auxiliary system 19. Other loads include a water pump 20 and fans 22, both part of a thermal system 23, which is designated generally by the dashed line. It is understood that a thermal system, such as the thermal system 23, may include additional or different components, depending on the particular vehicle design.

An air conditioning compressor 24, is part of a cooling system, and provides yet another electrical load. Additional miscellaneous loads include a DC-DC Low Voltage Converter 26 which feeds a Vehicle Low Voltage Load 28. The low voltage vehicle load 28 represents one or more low voltage loads within the vehicle. Such low voltage loads may include the vehicle headlights, radio, cigarette lighter, and/or other low voltage loads. A power steering (PS) pump 30 is another load which draws current from the high voltage bus 10.

A second power source, or battery 32, is connected to the bus 10 through a voltage regulator, or high voltage energy converter (HVEC) 34. The term "second" power source merely implies a power source in addition to the fuel cell 12. Although the second power source in this embodiment is a battery, and in particular a nickel metal hydride battery, it could be virtually any type of power source capable of supplying and receiving current. Other examples of a second power source include a lead acid battery and an ultracapacitor.

The HVEC 34 is a bidirectional buck-boost voltage regulator that can source current onto the bus 10 from the battery 32, or it can take current off the bus 10 and place it into the battery 32. The latter function is commonly referred to as regeneration. The HVEC 34 is referred to as a "buck-boost" voltage regulator because it has the ability to increase, or boost, the voltage of the battery 32 to match the voltage of the bus 10, or alternatively, reduce, or buck, the voltage of the battery 32 to match the voltage of the bus 10. The HVEC 34 regulates the battery voltage by controlling—i.e., increasing, decreasing, and/or maintaining—the battery current flow.

Each of the blocks in FIG. 1 may actually represent three entities: a physical device, power circuitry, and a control microcomputer. In addition, the IPT 14 may include elements such as a motor transaxle and an inverter. A resistor 36 is in selective electrical communication with the HVEC 34, and can serve a number of functions by selectively receiving current through the HVEC 34. For example, the resistor 36 can be used to heat up a high temperature cooling loop in the thermal system 23, and it can also act as an additional load on the bus 10 when excess energy is available.

Figure 2:
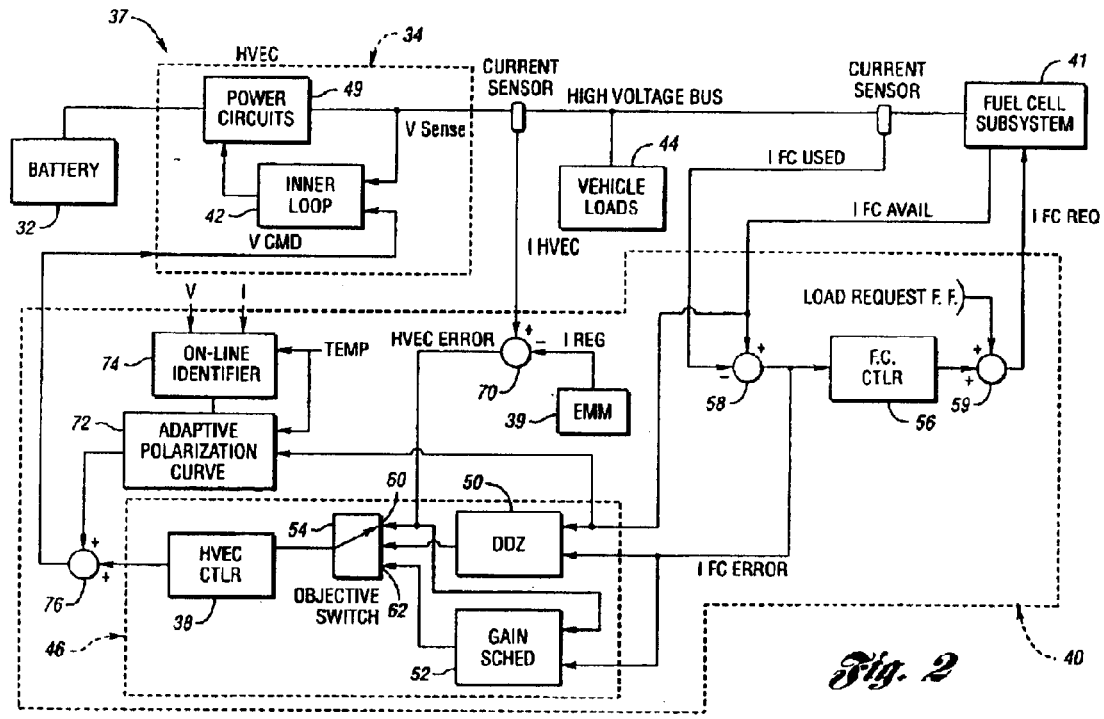
FIG. 2 is a control loop illustrating the system of the present invention.

FIG. 2 is a control loop illustrating a control system 37 of the present invention. A first controller, or HVEC controller 38, is integrated into an onboard computer, or vehicle system controller (VSC) 40. The VSC 40 is responsible for overall control and monitoring of the vehicle. In the embodiment illustrated in FIG. 2, the HVEC controller 38 is a software controller—i.e., the VSC 40 is programmed and configured to execute control algorithms that include the HVEC controller 38. Of course, an HVEC controller, such as the HVEC controller 38, may be a physical device separate from the VSC 40, or it may be integrated into the software of another computer.

In addition to the HVEC controller 38, the control system 37 includes a second controller, or fuel cell controller 56, which is described in more detail below. A third controller that may optionally be used with a control system, such as the control system 37, is an energy management module (EMM) 39. The EMM 39 can be used as a dedicated controller, responsible for management of the battery-resistor-HVEC subsystem. All of the controllers in the control system 37 are interconnected over a controller area network (CAN) which facilitates communication between the controllers.

A fuel cell subsystem 41 (shown in FIG. 2), includes the fuel cell 12 and the fuel cell auxiliary system 19 (see FIG. 1). Thus, within the context of describing the control system 37, the fuel cell subsystem 41 generally represents both the fuel 12 and the fuel cell auxiliary system 19. The fuel cell subsystem 41 receives signals from, and sends signals to, the VSC 40. Among these signals is a fuel cell current request (I FC REQ), which the fuel cell 12 uses to generate current at an appropriate level. The available fuel cell current (I FC AVAIL), and fuel cell current used (I FC USED) are input by the fuel cell 12 into the VSC 40.

The HVEC 34 is a primary control device for maintaining the balance of currents on the bus 10. The HVEC 34 acts as a bidirectional gateway for controlling the battery current flow. On the high voltage load side of the bus 10, the HVEC 34 acts like a voltage regulator. As described more fully below, the HVEC 34 receives a voltage command (V CMD) from the HVEC controller 38. Of course, the VSC may send many voltage commands to the HVEC to continuously adjust the battery current flow as system equilibrium is sought. As seen in FIG. 2, the HVEC 34 receives the voltage command into an inner control loop 42. The inner control loop 42 is also connected to the bus 10, such that it can detect voltage changes which may result from vehicle load changes.

The vehicle loads, many of which are illustrated separately in FIG. 1, are shown in aggregate in FIG. 2 in block 44. In the embodiment shown in FIGS. 1 and 2, all of the vehicle electrical loads are connected to the bus 10 between the HVEC 34 and the fuel cell 12. This is not required for the control system 37 to function; however, such a configuration may have certain advantages. For example, when the vehicle electrical loads are directly connected to the fuel cell, as they are in this configuration, the current can flow from the fuel cell 12 to the loads 44 without passing through another device. This is an inherently efficient architecture. In addition, such an architecture may be relatively low in cost, since the battery 32 and HVEC 34 need not be large, as they only temporarily fill in current when the fuel cell cannot immediately provide it.

When a change in any of the vehicle loads first occurs, it is quickly detected by the HVEC 34. In particular, the load change will cause a voltage change on the bus 10 that will be detected by the inner control loop 42. The inner control loop 42 may operate about 20 times faster than outer control loop 46, which is described more fully below. The inner control loop 42 outputs a signal to HVEC power circuits 49 indicative of the load change. The HVEC 34 then adjusts the battery current flow a first time based on the vehicle electrical load change. The battery current flow is adjusted to compensate for the electrical load change. Thus, the amount of current required by the load change—is either added to, or subtracted from, the bus 10, thereby maintaining a substantially constant voltage on the bus 10. In this way, the fuel cell 12 perceives no change in operating point; therefore, it remains stable during the first few milliseconds of any load change.

It would, of course, be undesirable to have the fuel cell 12 put out a fixed amount of current indefinitely. This would require the battery 32 to continuously supply at least some of the current to the loads 44, and the battery 32 would soon be drained. In order to ensure that this situation does not occur, the outer control loop 46, takes over control of the system from the inner control loop 42.

The outer control loop 46 is shown in FIG. 2. It is part of a preprogrammed algorithm in the VSC 40, and may be configured to operate at a slower speed than that of the inner control loop 42. In fact, the outer control loop 46 may operate with a loop time of about 10 milliseconds. The outer control loop 46 includes a dynamic dead zone function 50, a gain scheduler 52, an objective switch 54, and the HVEC controller 38. It is worth noting that although the objective switch 54 and the HVEC controller 38 are shown as separate components in FIG. 2, they are, in this embodiment, part of the control algorithms programmed into the VSC 40. Thus, the objective switch 54 may be viewed as being a part of the HVEC controller 38. Alternatively, each of the components in the VSC 40 may be a separate physical component, or part of a program of another computer.

The fuel cell controller 56 may be part of a preprogrammed algorithm within the VSC 40, it may be a separate physical device, or it may be part of a program of another controller. Summing junctions 58, 59 may be included in the fuel cell controller 56, or they may be part of a separate program within the VSC 40. One function of the fuel cell controller 56 is to fine tune a feedforward current request (LOAD REQUEST F.F.) until the available fuel cell current (I FC AVAIL) matches the fuel cell current used (I FC USED). This results in stabilization of the fuel cell 12.

The feedforward current request is added to output from the fuel cell controller 56 at the summing junction 59 to create the fuel cell current requests (I FC REQ) that is fed into the fuel cell subsystem 41. The feedforward current request may come from the VSC 40, and may be communicated directly to the VSC 40 from a load module, such as the A/C compressor 24 (see FIG. 1). Such a current request—i.e., one caused by a change in the operating state of a device such as the A/C compressor 24—results from an "expected" load change. Similarly, current requests caused by driver commands, for example, a requested increase in acceleration, also result from expected load changes.

In contrast to the expected load changes, are "unexpected" load changes. These may be caused by changes in the operating state of a device that does not directly signal the VSC 40—e.g., a power steering pump. Similarly, unexpected load changes may be caused by variations within the IPT 14 under normal operating conditions. Thus, a fuel cell current request (I FC REQ) may be generated by the fuel cell controller 56 without the input of a feedforward current request. This is because the fuel cell current used (I FC USED), is measured directly on the bus 10, which facilitates detection of unexpected load changes.

The fuel cell controller 56 also sends signals to the outer control loop 46, and in particular, to the DDZ 50 and the Gain Scheduler 52. The fuel cell controller 56 sends a first error signal, or fuel cell current error signal (I FC ERROR) to both the DDZ 50 and the gain scheduler 52, and additionally sends the amount of available fuel cell current (I FC AVAIL) to the DDZ 50. The DDZ 50 uses the information from the fuel cell controller 56 to change the objective switch 54 between a first position 60, corresponding to a first objective, and a second position 62, corresponding to a second objective.

The two objectives are used by the HVEC controller 38 to bring the control system 37 to an equilibrium, point. The equilibrium point may be defined as a steady-state load condition wherein most or all of the current is provided by the fuel cell 12, and little or no current is provided by the battery 32. Thus, zero current flow to or from the battery 32 may be an indication that the system is at equilibrium. In this regard, a target battery current flow of zero may be desired to bring the system into equilibrium. Equilibrium may also be defined as a state in which the current flow to and from the battery 32 is a predetermined constant. The predetermined constant may be programmed into the EMM 39, such that when a current requested from the battery 32 (I REQ) is at or near the predetermined constant, the system may be considered to be at equilibrium.

The DDZ 50 may be programmed to process the information it receives in any of a number of ways, including the use of a lookup table. Thus, the DDZ 50 may apply the information it receives from the fuel cell controller 56 to a lookup table in order to determine if the objective switch should be in the first position 60, or the second position 62. The lookup table may be generated, and subsequently programmed into the DDZ 50, by using known tolerance bands of the fuel cell 12.

Figure 3:
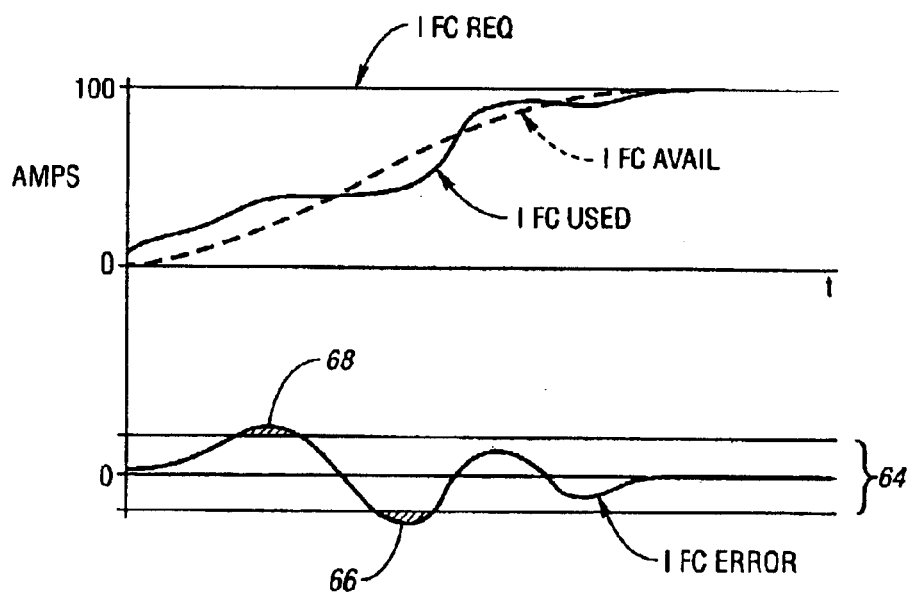
FIG. 3 is a graph illustrating the relationship between available fuel cell current, fuel cell current used, a fuel cell current request, and fuel cell current error.

FIG. 3 (with additional reference to FIG. 2), illustrates the application of the fuel cell current error (I FC ERROR) to a known tolerance band 64 in the DDZ 50. The upper portion of FIG. 3 shows how various currents in the system 37 might change over time (t). For example, a fuel cell current request (I FC REQ) is shown holding steady over time at 100 amps, while the available fuel cell current (I FC AVAIL) and the fuel cell current used (I FC USED) change over time. As discussed above, the fuel cell current request is generated by the fuel cell controller 56, and may be the result of an expected or an unexpected load change.

The fuel cell subsystem 41 attempts to increase the available fuel cell current to match the fuel cell current request. As seen in FIG. 3, this increase is not immediate, but rather, may occur gradually over time. This is why the battery 32, with its quicker response time, is initially used to compensate for the load change. Despite the use of the battery 32 to augment the current output of fuel cell 12, the fuel cell current used (I FC USED) may not match the available fuel cell current. In fact, as illustrated in FIG. 3, the fuel cell current used may be greater or less than the available fuel cell current.

The difference between the fuel cell current used and the available fuel cell current is the fuel cell current error (I FC ERROR). As illustrated in the lower portion of FIG. 3, the fuel cell current error may stay within the tolerance band 64, or it may rise above it or dip below it. Tolerance bands, such as the tolerance band 64, may be provided by a fuel cell manufacturer, or may be determined empirically through experimentation. The tolerance band for a given fuel cell may change, becoming wider or narrower, as the operating state of the fuel cell changes. The tolerance bands for various operating states may be compiled in a lookup table that is programmed into the DDZ 50.

It is desirable to maintain the fuel cell current error within a tolerance band, such as the tolerance band 64. This is because a fuel cell current error that is too large, either in the positive or negative direction, may have undesirable effects. In particular, fuel cell current errors that are too large in a negative direction (see the hatched section 66 in FIG. 3), indicates that there is more fuel cell current available than is being used. This results in unused fuel, and may adversely affect fuel economy. Similarly, when the fuel cell current error is too large in a positive direction (see the hatched section 68), the vehicle is attempting to use more fuel cell current than is available, and this can damage the fuel cell.

Thus, it is desirable to operate the control system 37 such that the fuel cell current error stays within the given tolerance band. Whether the fuel cell current error is inside or outside the tolerance band, determines which of the two objectives should be used. This also dictates the position of the objective switch 54.

When the fuel cell current error is within the tolerance band, the DDZ will place the objective switch 54 in the first position 60 such that the first objective is utilized. This occurs when the system is close to equilibrium, or within the "dead zone". The HVEC controller 38 will then fine tune its voltage signal to the HVEC 34 to try to bring the system into equilibrium. One way it accomplishes this is by using a second, or HVEC, error signal (HVEC ERROR).

The HVEC error is the difference between a measured current (I HVEC) and the requested current (I REQ),which may be generated by the EMM 39. The two currents, (I HVEC) and (I REQ), are summed at a summing junction 70 to calculate the HVEC error. The HVEC error is used by the HVEC controller 38 in both the first and second objectives, as the HVEC controller determines voltage commands to bring the system into equilibrium. For example, when the first objective is utilized—i.e., when the objective switch is in the first position 60—the HVEC error is received by the HVEC controller 38 and used to generate a voltage command for the HVEC 34. Conversely, the HVEC error is used by the gain scheduler 52 when the second objective is utilized.

Outside the dead zone—i.e., when the fuel cell current error is outside the fuel cell tolerance band—the DDZ 50 will place the objective switch 54 in the second position 62 such that the second objective is utilized. The gain scheduler 52 receives both the HVEC error and the fuel cell current error, and compares their relative signs. Since both error signals can be positive or negative, four polarity combinations exist (+/+, +/−, −/+, −/−). Each different polarity may require a different action by the HVEC controller 38. In fact, because the system is outside the dead zone, independent response tunings may be required. This is the function of the gain scheduler 52, which allows gains to be selectively applied to the signals it receives.

As discussed above, operating the fuel cell when the fuel cell current error is outside the tolerance band may be very undesirable. Hence, the battery current flow may need to be quickly adjusted to try to reduce (or increase) the fuel cell current error to minimize any deleterious effects. Thus, the gain scheduler is configured to apply an appropriate gain to the fuel cell current error, which is then input into the HVEC controller 38. Although in this embodiment the fuel cell current error is modified by the gain scheduler 52 before it reaches the HVEC controller 38, the fuel cell controller 56 effectively provides an input into the HVEC controller 38. In particular, the fuel cell current error relates to both the available fuel cell current and the fuel cell current used. The HVEC controller 38 then generates a voltage command which is sent to the HVEC 34 so the battery current flow can be appropriately adjusted.

Because the fuel cell current error is determined, in part, from the available fuel cell current, the fuel cell current error is indicative of the actual rate of change of the available fuel cell current. Moreover, as discussed above, the battery current flow is controlled by the HVEC 34, in part, based on the fuel cell current error. Therefore, the battery current flow is controlled, in part, based on the actual rate of change of the available fuel cell current. In this way, the HVEC controller 38 actually tracks the fuel cell response curve (see FIG. 3).

If the battery current flow can be adjusted at a rate very near the rate of change of the available fuel cell current, the fuel cell current used may closely track the available fuel cell current. This would cause the fuel cell current error to be constant, which would keep the fuel cell current error well within the tolerance band. As discussed above, this may be desirable for a number of reasons. Thus, the actual rate of change of the fuel cell current available can be called a target rate. The control system 37 is therefore configured to control the battery current flow at least partly based on the target rate.

Figure 4:
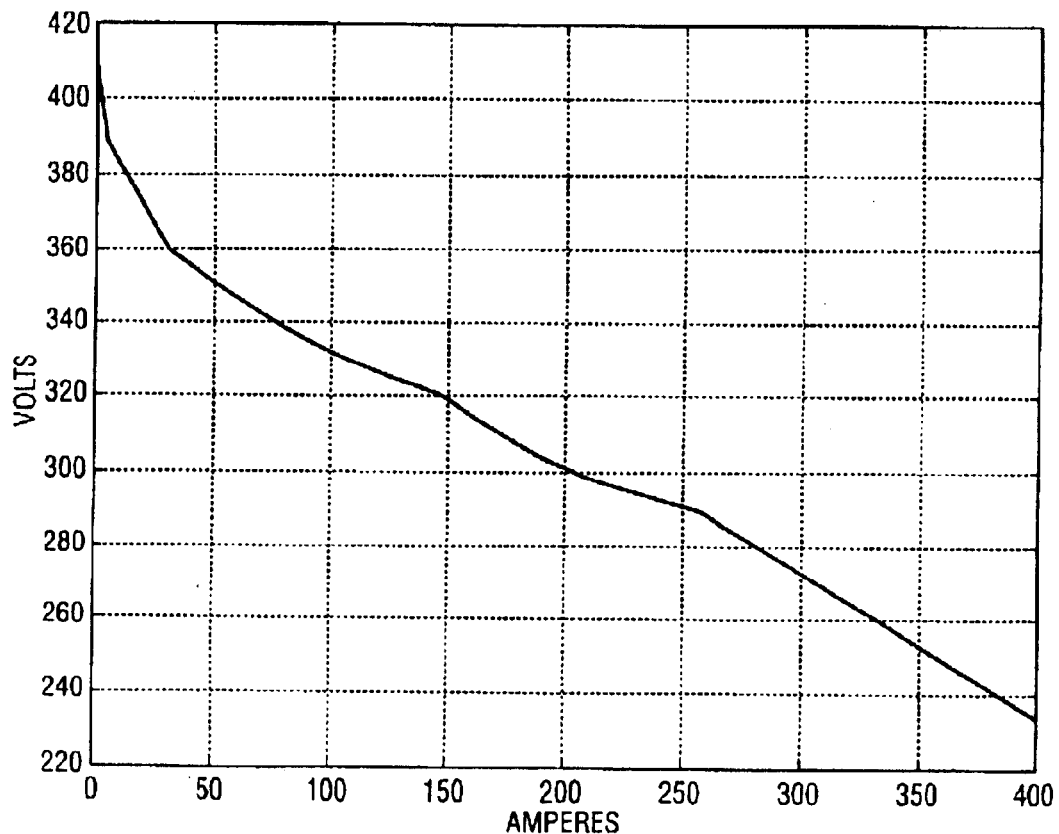
FIG. 4 is a polarization curve illustrating the relationship between voltage and current in a fuel cell.

The portions of the control system 37 described above may adequately control a hybrid fuel cell vehicle at close to optimal trajectories. Another enhancement that can be added to further improve tracking is an adaptive polarization curve in a feedforward loop. A polarization curve is a voltage versus current plot that describes the stable equilibrium points of devices such as fuel cells and batteries. An example of a polarization curve for a fuel cell is shown in FIG. 4. It is readily seen that there is a generally inverse relationship between voltage and current in a fuel cell—i.e., as one increases, the other decreases.

A device such as a fuel cell does not have a single polarization curve. In fact, polarization curves change not only from one fuel cell to another, but also change within a single fuel cell for different operating states. This is because the polarization curve is dependent upon the temperature of the fuel cell and other parameters. Thus, the use of a single polarization curve will not adequately describe the relationship between voltage and current for a given fuel cell.

The above issues notwithstanding, if care is taken to keep the initial curve table higher in value than the actual curve, an on-line adaptive learning system can be implemented to lower the assumed curve until it is very close to, but not below, the actual fuel cell curve. This curve can be adapted throughout the life of the vehicle. Information from the curve can then be added as a feedforward signal to the voltage command from HVEC controller 38, thereby increasing the response and stability of the control system.

The use of such an adaptive polarization curve is illustrated in FIG. 2. The VSC 40 is programmed and configured with an adaptive polarization curve function 72, which receives information regarding the relationship between voltage and current from an on-line identifier 74. The on-line identifier 74 is programmed into the VSC 40. The on-line identifier 74 adjusts its values, in part, based on the fuel cell temperature, which it receives as an input signal from a sensor (not shown) that senses fuel cell temperature. The amount of available fuel cell current (I FC AVAIL) is also fed into the adaptive polarization curve function 72. The adaptive polarization curve function 72 then outputs a signal to a summing junction 76, where it is added to a signal from the HVEC controller 38 to provide increased accuracy for the voltage command (V CMD) being input into the HVEC 34.

Figure 5:
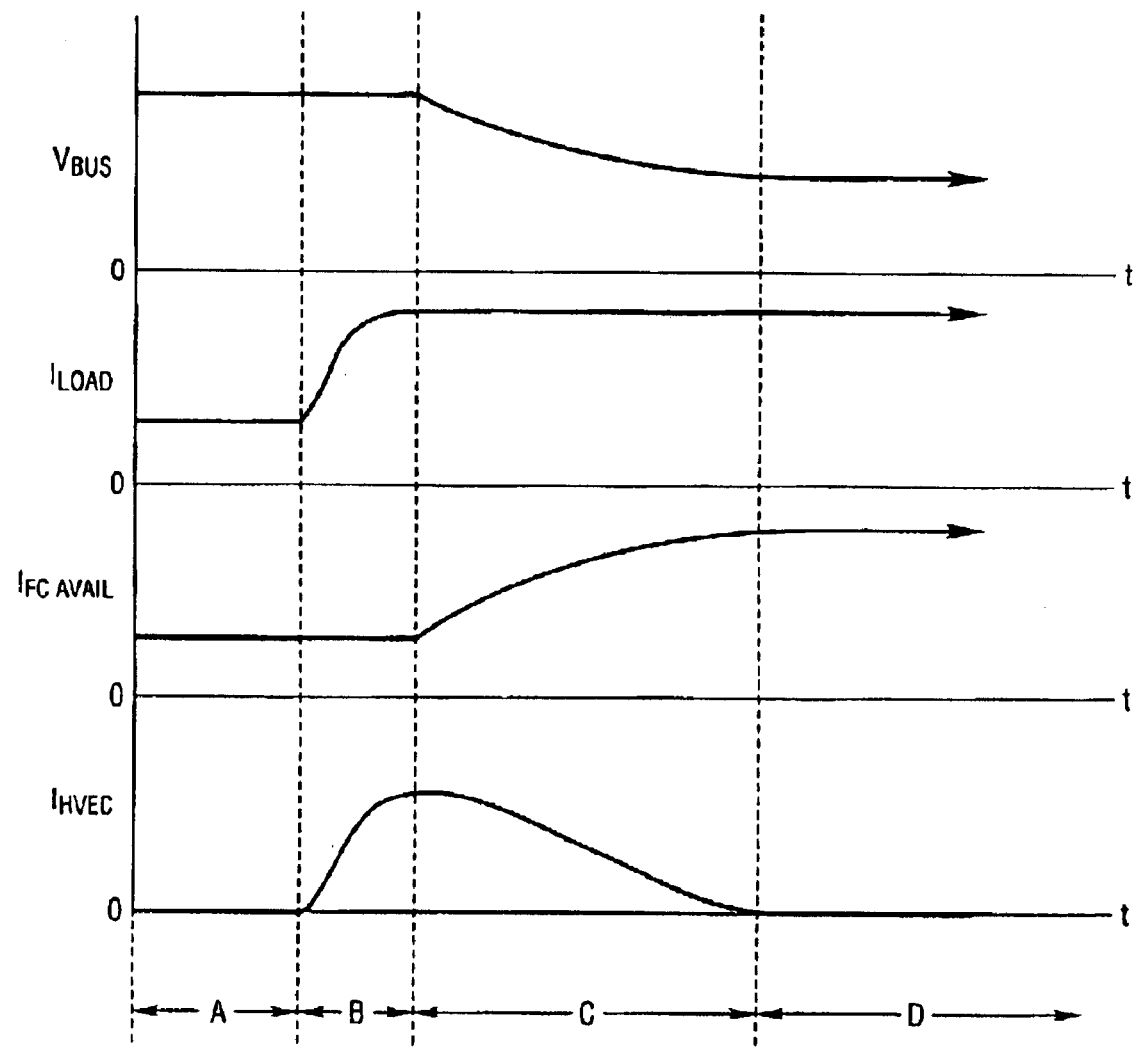
FIG. 5 is a graph illustrating the relationship between bus voltage, vehicle electrical loads, available fuel cell current, and battery current flow.

FIG. 5 illustrates the relationship over time (t) between the bus voltage (V BUS), the vehicle loads (I LOAD), the fuel cell current available (I FC AVAIL), and the battery current flow (I HVEC) when a vehicle load changes. For clarity, all the vehicle electrical loads are represented by (I LOAD). Thus, the sum of the available fuel cell current (I FC AVAIL) and the battery current flow (I HVEC) equals the vehicle electrical load (I LOAD). Initially, the system is at equilibrium (Time A). During this time, all of the vehicle current load is being provided by the fuel cell (I LOAD=I FC AVAIL). At the end of Time A, a vehicle load increases. As seen in FIG. 5, the available fuel cell current does not initially change. This may be due, in part, to the slow response time characteristic of fuel cells.

The battery current (I HVEC) quickly changes in response to the vehicle load change. With reference to FIG. 2, the vehicle load increase would be detected by a voltage change (a decrease) on the bus 10, which is sensed, and input into the inner loop 42 of the HVEC 34. The HVEC 34 then adjusts the battery current flow a first time based on the load change. During Time B, the battery current flow may receive additional adjustments based on the HVEC error, so that the increase in battery current flow tracks the load increase.

As discussed above, the vehicle load change may be detected by the fuel cell controller 56 either from the feedforward current request, or from the fuel cell current error. Thus, the load cell controller 56 will generate the fuel cell current request based on the load change. Because the load change in this example is a load increase, an increase in current will be requested from the fuel cell subsystem 41. At the end of Time B, the fuel cell 12 begins to generate additional current. This is illustrated in FIG. 5 by the rising (I FC AVAIL) curve.

During Time C, the available fuel cell current continues to increase based on the fuel cell current requested by the fuel cell controller 56. Also during Time C, the battery current flow is continuously adjusted, in this example decreased, in conjunction with the increase in available fuel cell current. The battery current flow is adjusted as discussed above. Specifically, if the fuel cell current error is within the predetermined tolerance band, the HVEC error is used by the HVEC controller 38 to generate a first voltage command. Conversely, if the fuel cell current error is outside the predetermined tolerance band, a gain is applied to the fuel cell current error, and it is used by the HVEC controller 38 to generate a second voltage command. As seen in FIG. 2, the adaptive polarization curve 72 may also be utilized to fine tune the first and second voltage commands prior to their being input into the HVEC 34.

As used here, the terms "first" and "second" voltage commands are used merely to distinguish between voltage commands generated when the fuel cell current error is inside or outside the predetermined tolerance band. In practice, many voltage commands will be generated such that the battery current flow is continuously adjusted until equilibrium is reached. Moreover, the decrease of the battery current flow during Time C tracks the increase in available fuel cell current, such that the battery current flow adjustment is, in part, based on the actual rate of change of available fuel cell current. Finally, at the end of Time C, the available fuel cell current is equal to the vehicle electrical load, and the battery current flow is constant. Thus, the system is in equilibrium, where it remains during Time D until another load change occurs.

Although the discussion above involved a load increase, a similar situation occurs in the case of a load decrease. Specifically, a decrease in current load would result in a voltage increase on the bus 10. This voltage increase would be sensed by the inner control loop 42, which would decrease battery current flow, or cause current to flow into the battery 32, thereby facilitating regeneration. If necessary, the resistor 36 (see FIG. 1) could be connected to the bus 10 to draw excess current if the battery was fully charged. In addition, the IPT 14 may be configured to use excess current in the event of a sharp load decrease. The fuel cell current requested would then decrease over time, and the battery current flow would be adjusted in conjunction with this decrease. The system would again reach equilibrium, and maintain a steady-state condition until another vehicle electrical load change.

While the best mode for carrying out the invention has been described in detail, those familiar with the art to which this invention relates will recognize various alternative designs and embodiments for practicing the invention as defined by the following claims.

What is claimed is:

1. A power distribution control system for a vehicle having a fuel cell and a second power source connected to an electrical bus, the control system comprising:
    a voltage regulator configured to control voltage on the bus;
    a first controller for controlling the voltage regulator;
    a computer programmed and configured with fuel cell characteristics for relating fuel cell voltage to fuel cell current, the computer being further programmed and configured to receive a current request at least partly based on vehicle loads, and to determine a first voltage related to the current request using the fuel cell characteristics; and
    a second controller configured to receive a voltage signal from the computer and to provide a current command to the first controller, the voltage signal being at least partly based on the first voltage and a measured voltage.

2. The control system of claim 1, wherein the second power source is one of a nickel metal hydride battery, a lead acid battery, and an ultra-capacitor.

3. The control system of claim 1, further comprising a third controller for controlling the fuel cell.

4. The control system of claim 1, wherein the computer is further programmed and configured to execute control algorithms, the control algorithms including the first controller, the second controller, and the third controller.

5. The control system of claim 1, wherein the voltage regulator and the fuel cell are disposed on the bus such that all vehicle electrical loads connect to the bus between the voltage regulator and the fuel cell.

6. The control system of claim 1, wherein the fuel cell characteristics comprise a plurality of fuel cell polarization curves.

7. The control system of claim 1, wherein the voltage signal received by the second controller is a voltage error, the voltage error being the difference between the first voltage and a measured voltage.

8. The control system of claim 1, wherein the second controller is further configured to provide current commands to the first controller to achieve a target current flow for the second power source.

9. The control system of claim 7, wherein the target current flow for the second power source is a predetermined constant.

10. A method of controlling the power distribution in a vehicle having a fuel cell and a second power source, the method comprising:
    generating a first voltage based on a vehicle electrical load change;
    generating a first current command at least partly based on the first voltage and a measured voltage;
    adjusting current flow of the second power source at least partly based on the current command;
    adjusting available fuel cell current at least partly based on the vehicle electrical load change;
    continuously adjusting current flow of the second power source at least partly based on additional current commands until an equilibrium point is reached.

11. The method of claim 9, wherein the equilibrium point is reached when the current flow of the second power source is a predetermined constant.

12. The method of claim 9, wherein the first current command is generated at least partly based on a voltage error, the voltage error being the difference between the first voltage and the measured voltage.

13. The method of claim 9, wherein the continuous adjustment of the current flow occurs at a predetermined rate, the predetermined rate being based on calibrated fuel cell current output.

14. The method of claim 9, wherein the first voltage is generated by applying a current request to a fuel cell polarization curve.

15. The method of claim 14, wherein the fuel cell polarization curve is chosen from a family of curves based on fuel cell operating conditions.

16. The method of claim 9, wherein the current command is partly based on a disturbance voltage.

17. A vehicle having a fuel cell and a second power source connected to an electrical bus, and a power distribution system for controlling the distribution of power in the vehicle, the power distribution system comprising:
    a voltage regulator configured to control voltage on the bus;
    a first controller for controlling the voltage regulator;
    a computer programmed and configured with fuel cell characteristics for relating fuel cell voltage to fuel cell current, the computer being further programmed and configured to receive a current request at least partly based on vehicle loads, and to determine a first voltage related to the current request using the fuel cell characteristics; and
    a second controller configured to receive a voltage signal from the computer and to provide a current command to the first controller, the voltage signal being at least partly based on the first voltage and a measured voltage.

18. The vehicle of claim 17, wherein the fuel cell characteristics comprise a plurality of fuel cell polarization curves.

19. A controller for controlling the power distribution system in a vehicle, the vehicle having a fuel cell and a second power source, the controller comprising:
    an algorithm for generating a first voltage at least partly based on vehicle electrical loads, for generating a current command at least partly based on the first voltage and a measured voltage, for adjusting current flow of the second power source at least partly based on the current command, for adjusting available fuel cell current at least partly based on the vehicle electrical loads, and for continuously adjusting the current flow of the second power source until an equilibrium point is reached.

20. The controller of claim 19, wherein the equilibrium point is reached when the current flow of the second power source is a predetermined constant.

* * * * *